E. BOURNE.
Plows.
No. 144,653.
Patented Nov. 18, 1873.
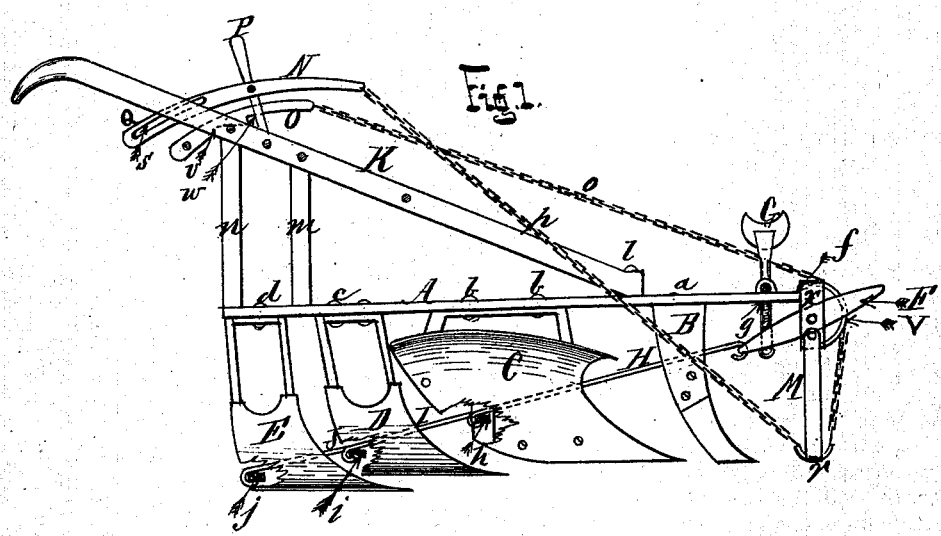
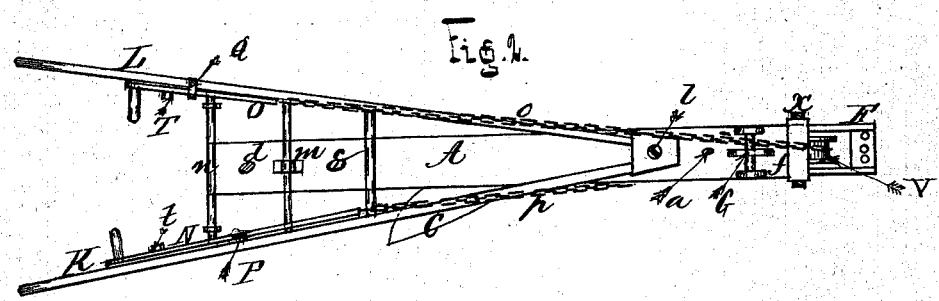
Witnesses.
Inventor.

UNITED STATES PATENT OFFICE.

ELIJAH BOURNE, OF NEW IBERIA, LOUISIANA.

IMPROVEMENT IN PLOWS.

Specification forming part of Letters Patent No. 144,653, dated November 18, 1873; application filed April 17, 1873.

*To all whom it may concern:*

Be it known that I, ELIJAH BOURNE, of New Iberia, parish of Iberia, State of Louisiana, have invented certain Improvements in Plows, of which the following is a specification:

The object of my invention is to provide an improved plow, which consists of a combination of a turning-plow with a cutter and one or more subsoil-plows. These plows and cutter are not placed in a beam, as is generally the case, but are fastened, by aid of screws, to a plank, to which the handles are attached, pointing out in the rear. To the front part of the plank is attached a double or swinging clevis, which is adjusted by aid of a thumb-screw passing through the plank. To the front part of this clevis are attached the draft-animals, while to the back part of the same is attached a rod, running through the cutter, turning-plow, and hooked onto the cross-bar in the heel of the plow. Another bar connects the cross-bar in the turning-plow to the cross-bar in the subsoil-plow. If more subsoils are used, similar rods connect them together. This draft-line can be regulated by aid of the thumb-screw, mentioned above, in the plank and clevis, to suit the different heights of the animals. Attached to the plank in front of the cutter is a movable foot-rest, on which the plow rests when it is turned around, or in transit from one place to the other. It is held in this position, or thrown out, by aid of chains and levers, which are attached to the handles of the plow.

In order to describe my invention more fully, I refer to the accompanying drawing forming a part of this specification.

Figure I is a side view of a turning-plow and two subsoil-plows embodying my invention. Fig. II is a plan view of the same.

A is the plank. B is the cutter, opening the sod, and fastened to the plank by screws at $a$. C is the turning-plow, fastened to the plank by screws at $b$. D and E are subsoil-plows, fastened to the plank by screws at $c$ and $d$. The subsoil-plow D is placed so as to cut down into and pulverize the soil of the furrow cut by the turning-plow, while the subsoil-plow E is placed still lower, in order to cut still deeper, and pulverize the soil, and so on, if more subsoil-plows are employed. F is a double clevis, pivoted to the square frame X, which is fastened to the plank at $f$. This clevis is adjusted by aid of a thumb-screw, G, passing through the plank at $g$. H is a rod, hooked at one end to the clevis, and passing through the cutter B and turning-plow C, and is hooked by the other end to the cross-bar $h$ at the heel of the plow C. I is a similar rod, connecting the cross-bar $h$ to the cross-bar $i$ of the subsoil-plow D. J is another bar, connecting the cross-bar $i$ to the cross-bar $j$ of the subsoil-plow E. K and L are handles for guiding the plows, held to the plank A by aid of the screw $l$ and standards $m$ and $n$. To the lower part of the frame X is pivoted the foot-rest M, which is adjusted by aid of chains $o$ and $p$, attached to the arms N and O, and lever P, and slide Q, the chains being conducted over the semicircular groove V.

When it is desired to turn around or move the plow over the ground, the foot-rest M is placed in a vertical position, so that the plow rests on the shoe $r$ by pulling the arm N backward until it locks itself by aid of the slot S and pin $t$, at the same time unhooking the slot $w$ in the arm O from the pin T, and pushing the arm forward until held by the pin T in the slot U.

When the plow is placed in the soil and worked therein, the foot-rest M is drawn forward by pulling the arm O backward and pushing the arm N forward.

Having thus described my invention, I desire to claim—

1. The clevis F, rods H, I, and J, and cross-bars $h$, $i$, and $j$, in combination with the plank A, frame $e$, thumb-screw G, and plows C, D, and E, substantially as and for the purpose hereinbefore set forth.

2. The movable foot-rest M, having a shoe, $r$, on the lower end, in combination with the plank A, frame $e$, chains $o$ and $p$, arms N and O with slot S, slide Q, and pins $t$ and T, substantially as and for the purposes hereinbefore set forth.

ELIJAH BOURNE.

Witnesses:
R. WALKER,
J. NARCISSE LANDRY.